Nov. 6, 1928.
H. O. DALBEY, SR
1,690,570
ELECTRIC BROILER
Filed April 25, 1927
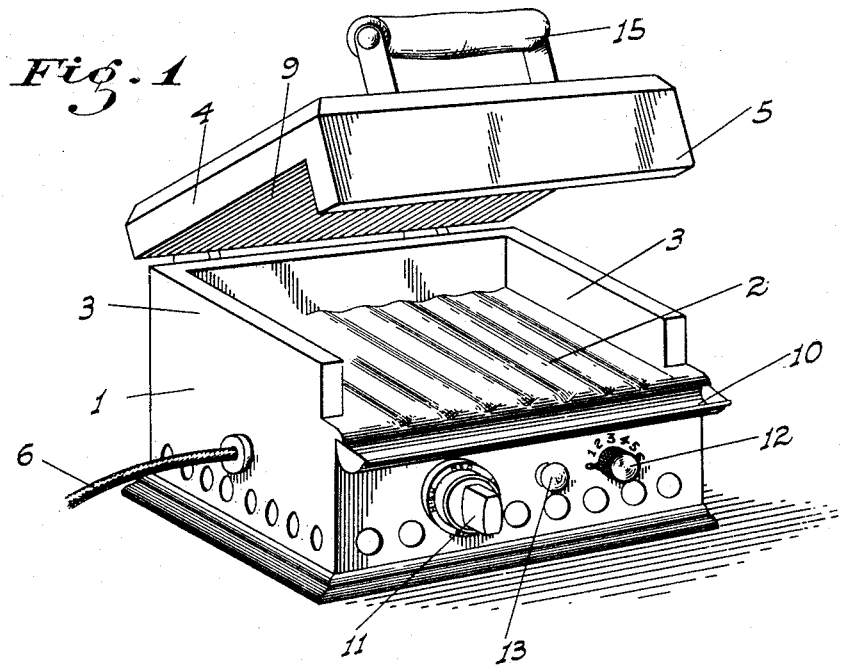
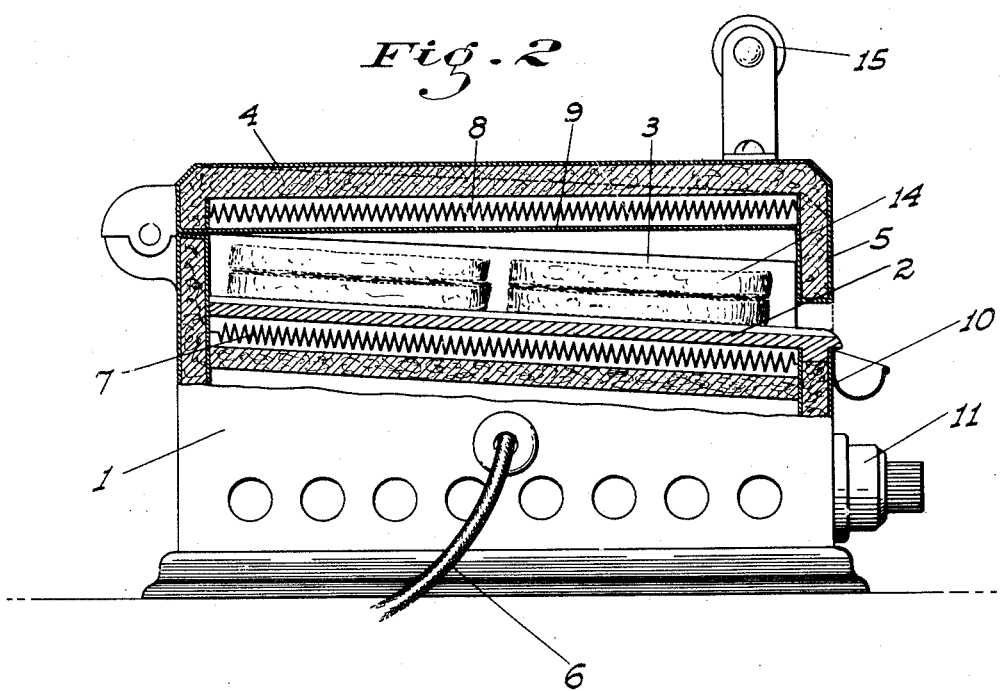
INVENTOR
*H. O. Dalbey Sr.*
BY
ATTORNEY Patented Nov. 6, 1928.

1,690,570

UNITED STATES PATENT OFFICE.

HARVEY O. DALBEY, SR., OF OAKLAND, CALIFORNIA.

ELECTRIC BROILER.

Application filed April 25, 1927. Serial No 186,256.

This invention relates to broilers and is particularly directed towards electric broilers wherein the source of heat is derived from electrical heating resistance elements. The primary object of the invention is to provide a broiler of this character which can be used very effectively in the making of the present far famed toasted sandwich, and in addition thereto it is an aim of the invention to adapt the broiler for use in the cooking of steaks, chops, or like foods.

A further object of the invention is to produce a broiler of a portable type so that it may be mounted on a counter or other place found desirable in restaurants, grills and like places, where the food products may be cooked exactly according to the order of the patron and in a most cleanly and sanitary way, and to an absolute uniformity on both sides of the material being cooked.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of my improved broiler showing the upper lid in partly open position.

Fig. 2 is a side elevation of the same partly broken out and in section to show the interior of the broiler with material therein to be cooked. The lid in this view is also shown partly open, the full closed position being indicated by dotted lines.

Referring now more particularly to the characters of reference on the drawings, the numeral 1 designates the main body of the broiler which is preferably portable and has an inclined fluted top plate 2 upstanding around the two sides and back of which is a flange 3. Hinged to the body 1 is the lid 4 which is substantially flat and adapted to rest on the top edge of the flange 3 and on the front end of which is a downwardly extending flange 5 adapted to cover the open end of the broiler between the side flanges 3 so as to make a completely enclosed air tight chamber within the broiler when the lid 4 is moved to closed position.

An electric cord 6 is adapted for connection with any source of electrical energy and connects inside of the broiler with an electrical heating resistance wire 7 underneath the main plate 2 and also with a similar wire 8 within the lid 4. These elements 7 and 8 are connected together and are suitably installed and insulated in any manner well known in the art, hence I am not particularly describing the same in this application. A heating plate 9 forms the bottom side of the lid 4 and extends substantially parallel with the plate 2 when the lid 4 is closed.

The plate 2 has no obstruction on its lower edge so that when the lid 4 is raised grease may freely run therefrom off the front edge of said plate and if desired a catch trough 10 may be provided along such edge to receive said grease, from which trough the grease may be removed at will. A switch 11 may be used to control the on and off positions of the electric currents supplied to the elements 7 and 8. A time switch 12 of any desired type controlling the flashing of an electric light bulb or other signal 13 may be used on the front of the broiler to notify the operator when a given kind of food has remained in the broiler for the desired length of time. Such a signal means is common in the art and may be of any desired type is indicated, hence I do not at this time enter into a specific detailed description thereof.

In practice the food to be cooked, such as sandwichs, chops, steaks, or the like (shown in the drawing at 14 in the form of a sandwich), is placed on the plate 2. The lid 4 is then closed down in the manner indicated, completely enclosing the food in a substantially air-tight compartment with a uniform heating element disposed both above and below the same and in parallel relation.

Thus all the qualities of the food are retained within the compartment and none are allowed to escape by evaporation or the like, and the heating elements will cook the same to an absolute uniformity and alike on both sides. It will be obvious that present day largely consumed toasted sandwiches can be made in this broiler in a very perfect manner, and also chops, steaks, and other meats may be put in and cooked most effectively. The operator of the broiler will learn just how long certain foods should remain in the broiler to attain the proper degree of cooking as may be ordered by a patron, and to this end when the food is placed therein he will set the time switch 12 at 1, 2, 3, 4, or 5 minutes, etc., according to the time limit desired, and when that limit has been reached the signal 13 will flash and the food may then be removed.

The lid 4 is provided with an operating handle 15 and it will be apparent from the description given that my improved broiler is of a very simple construction and can be handled very easily and the foods cooked in a perfect and sanitary condition.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An electric broiler comprising a main body having a top plate, an upstanding flange on two sides and the back of the plate, a lid hinged to the body to rest on the flanges and having a depending flange to close the front open space between the side flanges when the lid is closed, and heating elements in the plate and lid.

2. An electric broiler comprising a main body having a top plate, an upstanding flange on two sides and the back of the plate, a lid hinged to the body to rest on the flanges and having a depending flange to close the front open space between the side flanges when the lid is closed, and heating elements in the plate and lid, the plate inclining from the back flange to the open front end.

3. In an electric broiler, a plate forming a supporting surface for the food to be cooked, said plate having a downward slant and longitudinally spaced corrugations, an upstanding flange around the sides and back of the plate the side flanges stopping short of the front edge of the plate, a lid hinged to the back flange, a flange on the front edge of the lid adapted, when the lid is closed, to project in front of the side flanges and rest on the top edge of the corrugated plate.

In testimony whereof I affix my signature.

HARVEY O. DALBEY, Sr.